(12) United States Patent
Tsai et al.

(10) Patent No.: US 9,029,488 B2
(45) Date of Patent: May 12, 2015

(54) PHOSPHATE-GROUP CONTAINING RESIN AND USE THEREOF

(75) Inventors: Chih-Hung Tsai, Taiwan (TW); Hsuan-Wan Peng, Taiwan (TW)

(73) Assignee: Elementis Specialties, Inc., East Windsor, NJ (US)

( * ) Notice: Subject to any disclaimer, the term of this patent is extended or adjusted under 35 U.S.C. 154(b) by 476 days.

(21) Appl. No.: 13/509,755

(22) PCT Filed: Nov. 16, 2009

(86) PCT No.: PCT/US2009/064559
§ 371 (c)(1),
(2), (4) Date: May 14, 2012

(87) PCT Pub. No.: WO2011/059454
PCT Pub. Date: May 19, 2011

(65) Prior Publication Data
US 2012/0289673 A1    Nov. 15, 2012

(51) Int. Cl.
*C08F 230/02* (2006.01)
*C08G 63/692* (2006.01)
*C09C 1/64* (2006.01)
*C09C 3/10* (2006.01)
*C09D 5/02* (2006.01)
*C09D 5/36* (2006.01)
*C09D 7/12* (2006.01)

(52) U.S. Cl.
CPC ............ *C08G 63/6928* (2013.01); *C09C 1/644* (2013.01); *C09C 3/10* (2013.01); *C09C 2200/1058* (2013.01); *C09D 5/028* (2013.01); *C09D 5/36* (2013.01); *C09D 7/1225* (2013.01)

(58) Field of Classification Search
CPC ............ A61L 15/60; A61L 15/42; C08F 8/30
USPC .......................................................... 526/274
See application file for complete search history.

(56) References Cited

U.S. PATENT DOCUMENTS 6,099,968 A  *  8/2000  Harakawa et al. ............ 428/414
6,617,409 B2    9/2003  Yukawa et al.
8,409,721 B2    4/2013  Kobata et al.

FOREIGN PATENT DOCUMENTS

CN          101293941       10/2008

OTHER PUBLICATIONS

English translation of the Office Action, issued Jan. 5, 2013 in the Chinese counterpart Patent application No. 200980117035.0 (9 sheets).
Office Action, issued Jan. 5, 2013 in the Chinese counterpart Patent application No. 200980117035.0 (7 sheets).
English translation of the Office Action, issued Mar. 27, 2013 in the Taiwanese counterpart Patent application No. 098138856 (8 sheets).
Office Action, issued Mar. 27, 2013 in the Taiwanese counterpart Patent application No. 098138856 (5 sheets).

* cited by examiner

*Primary Examiner* — Ling Choi
*Assistant Examiner* — Chun-Cheng Wang
(74) *Attorney, Agent, or Firm* — Morgan, Lewis & Bockius, LLP

(57) ABSTRACT

The present invention provides a phosphate group-containing resin comprising, as polymerized units, a polymerizable unsaturated polyester having at least one phosphate group and/or having at least one phosphoric acid group, a (meth) acrylate based polymerizable monomer, and an alkoxylated (meth)acrylic acid polymerizable monomer; and a use of the phosphate-group containing resin as a treating agent of a metallic pigment or an inorganic pigment, especially used in a water-based coating composition.

19 Claims, No Drawings

PHOSPHATE-GROUP CONTAINING RESIN AND USE THEREOF

CROSS-REFERENCE TO RELATED APPLICATIONS

This application is a National Stage Application of International Application No. PCT/US2009/064559, filed on Nov. 16, 2009, incorporated herein by reference in its entirety.

FIELD OF THE INVENTION

The present invention relates to a novel phosphate-group containing resin and a use of the phosphate-group containing resin as a treating agent for a metallic pigment or an inorganic pigment, especially used in a water-based coating composition.

BACKGROUND

It is well known to use metallic pigments, such as aluminum flakes, or inorganic pigments in coating compositions to provide metallic glamour or a desired color, chiefly on exterior panels of automobiles, motorcycles, etc. The use of these pigments in solvent based coating compositions results in relatively few problems. In recent years, use of water based coating compositions is strongly required from the viewpoint of prevention of environmental pollution.

However, when being utilized in water based coating compositions, the pigments, particularly aluminum flakes, react with water and any acid components present in such coating compositions. Then, the pigments deteriorate and can cause the generation of hydrogen gas. Furthermore, the finish appearances resulting from such coating compositions have a reduced brightness and glamour.

In order to avoid such problem, phosphated random polymers have been added to water based coating compositions to protect the surface of the pigments based on the mechanism that the phosphated portion of the polymers provides passivation of the pigments so as to inhibit the reaction caused by direct contact of water with the pigments.

In this regard, Du Pont has disclosed a series of phosphated polymers which are added to pigment-containing coating compositions to protect the surface of pigments. Concerning the phosphated polymers disclosed by Du Pont Company, a phosphate group is provided by the reaction of glycidyl (meth)acrylate polyacrylate with phosphoric acid ester. For example, U.S. Pat. No. 5,104,922, issued on Apr. 14, 1992, has disclosed a water based metallic coating material comprising a phosphated linear polymer. U.S. Pat. No. 5,530,070, issued Jun. 25, 1996, has disclosed a water based metallic coating material comprising a phosphated graft copolymer having macromonomer side chains.

Kansai Paint Company has disclosed a series of phosphated polymers which are added to pigment-containing coating compositions to protect the surface of pigments. For the phospated polymers disclosed by Kansai Paint Company, a phosphate group is provided by phosphated acrylic monomer, instead of by the reaction of glycidyl(meth)acrylate polyacrylate with phosphoric acid ester. For example, U.S. Pat. No. 6,099,968, issued on Aug. 8, 2000, has disclosed a water based metallic coating material comprising a phosphated polymer obtained by copolymerizing: styrene, alkyl (meth)acrylate, phosphoric ester group-containing polymerizable unsaturated monomer, carboxyl-containing polymerizable unsaturated monomer, and hydroxyl-containing polymerizable unsaturated monomer. U.S. Pat. No. 6,617,409, issued on Sep. 9, 2003, has disclosed a water based metallic coating material comprising a phosphated polymer obtained by copolymerizing: a polymerizable monomer having a phosphate group, a polymerizable monomer having a phosphoric acid group, and a (meth)acrylate based polymerizable monomer having two tertiary alkyl groups in a molecular.

However, the novel phosphate group-containing resin provided by the present invention allows pigments to have improved dispersivity in water based coating compositions. In addition, the novel phosphate group-containing resin provided by the present invention offers an improved protection to pigments against the reaction with water, thereby improving the stability of coating compositions formulated with pigments.

SUMMARY OF THE INVENTION

The present invention provides for a novel phosphate group-containing resin comprising, as polymerized units: a polymerizable unsaturated polyester having at least one phosphate group and/or having at least one phosphoric acid group, a (meth)acrylate based polymerizable monomer, and an alkoxylated (meth)acrylic acid polymerizable monomer. In one embodiment, the (meth)acrylate based polymerizable monomer may contain 0.01-40 wt. % styrene.

The present invention further provides for a use of the phosphate-group containing resin as a treating agent for a metallic pigment or an inorganic pigment, especially used in a water-based coating composition.

The phosphate group-containing resin according to the present invention allows pigments to have improved dispersivity in water based coating compositions. The better dispersivity provides better metallic brightness of coating film. In addition, the novel phosphate group-containing resin provided by the present invention offers an improved protection to pigments against the reaction with water over a long period of time, thereby improving the stability of coating compositions formulated with pigments.

DETAILED DESCRIPTION OF THE INVENTION

The present invention provides a novel phosphate group-containing resin comprising, as polymerized units, (a) a polymerizable unsaturated polyester having at least one phosphate group represented by a formula [—OPO(OR$^1$)(OH)] (wherein R$^1$ represents a hydrocarbon group having 1 to 10 carbon atoms) and/or having at least one phosphoric acid group represented by a formula [—OPO(OH)$_2$], (b) a (meth)acrylate based polymerizable monomer which may contain 0.01-40% styrene, and (c) an alkoxylated (meth)acrylic acid polymerizable monomer.

The polymerizable unsaturated polyester includes a polyester having at least one phosphate group represented by a formula [—OPO(OR$^1$)(OH)] and/or having at least one phosphoric acid group represented by a formula [—OPO(OH)$_2$] and at least one polymerizable double bond in a molecule, wherein R$^1$ represents a hydrocarbon group having 1 to 10 carbon atoms. In one embodiment, R$^1$ includes, for example, linear or branched chain C$_{1-10}$ alkyl groups such as methyl, ethyl, propyl, isopropyl, butyl, isobutyl, sec-butyl, tert-butyl, pentyl, isopentyl, hexyl, octyl, 2-ethylhexyl, decyl and isodecyl. In another embodiment, R$^1$ represents a hydrocarbon group having 1 to 4 carbon atoms, and includes, for example, linear or branched chain C$_{1-4}$ alkyl groups such as methyl, ethyl, propyl, isopropyl, butyl, isobutyl, sec-butyl and tert-butyl.

The phosphate group contained in the polymerizable unsaturated polyester can be obtained by reacting, for example, one acidic hydroxyl group contained in a phosphoric acid monoester represented by $(HO)_2PO(OR^1)$, for example, phosphate such as monobutyl phosphate and monoisodecyl phosphate with a glycidyl group-containing polyester having at least one polymerizable double bond.

The polyester group contained in the polymerizable unsaturated polyester can be obtained by copolymerizing an acid and a hydroxyl-containing compound, wherein the acid includes, for example, 2-ethyl hexyl acid, benzoic acid, adipic acid, tetrahydrogen phthalic anhydride, isophthalic acid, terephthalic acid, maleic anhydride, cyclohexane dicarboxylic acid, trimellitic anhydride and mixtures thereof, and the hydroxyl-containing compound includes, for example, octanol, ethylene glycol, propanediol, butanediol, diethylene glycol, hexanediol, butyl ethyl propanediol, trimethylolpropane, ethoxylated trimethylolpropane, glycerin, neopentyl glycol, cyclohexane dimethanol, pentaerythritol, di-pentaerythritol, sorbitol and mixtures thereof.

The polymerizable unsaturated polyester has a weight average molecular weight of: 300-10000 g/mole or 500-3000 g/mole; a hydroxyl number of 50-400 mg KOH/g or 100-300 mg KOH/g; and an acid number of 100-350 mg KOH/g or 200-300 mg KOH/g.

The (meth)acrylate based polymerizable monomer used in the present invention has the general formula (I)

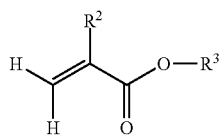

(I)

in which $R^2$ is hydrogen or methyl, and $R^3$ is a linear or branched alkyl having 1-22 carbon atoms. In one embodiment, the (meth)acrylate based polymerizable monomer includes acrylic acid, methacrylic acid, alkyl(meth)acrylate, 2-hydroxyl ethyl(meth)acrylate and mixtures thereof, wherein the alkyl is a linear or branched alkyl having 8-18 carbon atoms. In another embodiment, the (meth)acrylate based polymerizable monomer includes acrylic acid, methacrylic acid, alkyl(meth)acrylate, 2-hydroxyl ethyl(meth)acrylate and mixtures thereof, wherein the alkyl is a linear or branched alkyl having 12-13 carbon atoms. In some embodiments, the (meth)acrylate based polymerizable monomer may contain styrene. The amount of styrene may range from: 0.01 to 40 wt. %.

The alkoxylated (meth)acrylic acid polymerizable monomer is obtained by alkoxylating (meth)acrylic acid polymerizable monomer. In one embodiment, the alkoxylated moiety of alkoxylated (meth)acrylic acid polymerizable monomer (c) comprises at least one segment of

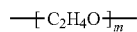

and at least one segment of

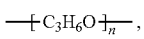

wherein m is an integer of: 5 to 50 or 5 to 30; and n is an integer of 5 to 50 or 5 to 30. In another embodiment, the alkoxylated (meth)acrylic acid polymerizable monomer is ethoxylated (meth)acrylic acid polymerizable monomer having a weight average molecular weight of 300 to 1500 g/mole, which comprises one segment of

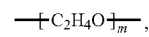

wherein m is an integer of 5 to 30.

The phosphate group-containing resin of the present invention can be produced by copolymerizing the polymerizable components (a) to (c) each described above in the presence of a polymerization initiator by a conventionally known method, for example, a solution polymerization method. The proportions of these polymerizable components in copolymerization shall not strictly be restricted and can be changed over a wide range depending on characteristics desired to the phosphate group-containing resin produced. In general, the components (a) to (c) are copolymerized in the following proportions based on the total weight of these components. The proportion of the polymerizable unsaturated polyester ranges from: 1 to 30% by weight or 2 to 25% by weight. The proportion of the (meth)acrylate based polymerizable monomer ranges from: 10 to 50% by weight or 15 to 40% by weight. The proportion of the alkoxylated (meth)acrylic acid polymerizable monomer ranges from 2 to 30% by weight or 5 to 20% by weight.

The phosphate group-containing resin of the present invention can have a weight average molecular weight falling in a range of: 1,000 to 100,000 g/mole; 1,000 to 50,000 g/mole; and 1,500 to 30,000 g/mole. The phosphate group-containing resin of the present invention can have an acid number falling in a range of: 0 to 250 mg KOH/g; 0 to 120 mg KOH/g; and 0 to 100 mg KOH/g and can originate from a phosphoric acid group and carboxylic acid group. The hydroxyl number falls within a range of 0 to 250 mg KOH/g; 0 to 120 mg KOH/g; and 0 to 80 mg KOH/g.

The phosphate group-containing resin of the invention is useful as a treating agent for a metallic pigment or an inorganic pigment, wherein the metallic pigment or organic pigment is used in a water-based coating composition. Typical metallic flake pigments that can be used are aluminum flake, bronze flake, nickle flake, stainless steel flake and the like. Aluminum flake is preferred since it imparts an automotive finish with the desired metallic glamour. Typical inorganic pigments that can be used are titanium dioxides, zinc sulfides, zinc oxides, iron oxides, magnetite, manganese iron oxides, chromium oxides, nickel or chromium antimony titanium oxides, manganese titanium rutiles, cobalt oxides, mixed oxides of cobalt and aluminum, rutile mixed-phase pigments, sulfides of rare earths, spinels of cobalt with nickel and zinc, spinels based on iron and chromium with copper, zinc and manganese, bismuth vanadates, pearl effect pigments, and extender pigments.

The water-based coating composition used in the present invention comprises water as a medium, the phosphate group-containing resin of the present application and metallic pigment or inorganic pigment as essential components, and when required, known additives such as a water-dispersible resin, color pigment, color space effect pigments, extender pigment, organic solvent, viscosity modifier, UV screener, defoaming agent and surface modifier.

The phosphate group-containing resin of the present invention offers an improved dispersivity to pigments in water based coating compositions. In addition, the novel phosphate group-containing resin provided by the present invention offers an improved protection to pigments against the reaction with water over a long period of time, thereby improving the stability of coating compositions formulated with pigments. This improvement may be demonstrated by the flop index value of a water born metallic paint containing the phosphate group resin of the present invention.

The present invention will be illustrated below with reference to following examples, without any intention thereby to restrict the invention. All parts and percentages are on a weight basis unless otherwise indicated. Molecular weights are determined by Gel Permeation Chromatography using polystyrene as the standard and tetrahydrofuran as the carrier solvent.

EXAMPLES

Abbreviations

MPEG: Methyl Polyethylene Glycol Ether
MPEG MA: Methyl Polyethylene Glycol Ether Methacrylate

Preparation of Unsaturated Polyesters

Example 1

Preparation of Polyester (A)

112.17 parts of trimethylol propane, 55.79 parts of neopentyl glycol, 58.05 parts of phthalic anhydride, 58.85 parts of adipic acid and 38.39 parts of maleic anhydride were placed in a glass reaction vessel, heated to 150° C., and then heated to 230° C. over a period of 4 hours. The reaction was maintained at 230° C. until the acid number reached 70 mg KOH/g. The temperature was lowered to 90° C., then 50 parts of propylene glycol monomethyl ether acetate were added, giving a solution of polyester (A).

Example 2

Preparation of Phosphoric Ester Polymer I 100.00 parts of polyester (A) obtained by Example 1, 20 parts of propylene glycol monomethyl ether acetate were added in a glass reaction vessel. The temperature was heated to 80° C. after which, 30 parts of polyphosphoric acid were added at 80° C. The temperature was maintained at 80° C. for 3 hours. Then 397.8 parts of propylene glycol monomethyl ether acetate were added to the vessel. The temperature was heated to 115° C. A mixture containing 99.4 parts of styrene, 124.3 parts of SLMA[1], 49.7 parts of 2-hydroyl ethyl methacrylate, 59.7 parts of MPEG 500MA[2] and 14.9 parts of Luperox-26[3] was added over a period of 2 hours. The reaction was maintained at 115° C. for another 2 hours. The phosphoric polymer solution had solid content of 50%, weight average molecular weight 10000 g/mole, hydroxyl number of 47 mg KOH/g and acid number of 80 mg KOH/g.
1) Misubish gas, SLMA, C12~C13 mixture of alkyl methacrylate
2) Evonik, F M 509, MPEG500 MA
3) Alkama, Luperox-26

Example 3

Preparation of Polyester (B)

163.59 parts of trimethylol propane, 118.53 parts of adipic acid and 39.78 parts of maleic anhydride were placed in a glass reaction vessel, heated to 150° C., and then heated to 230° C. over a period of 4 hours. The reaction was maintained at 230° C. until the acid number reached 70 mg KOH/g. The temperature was lowered to 90° C., then 50 parts of propylene glycol monomethyl ether acetate were added, giving a solution of polyester (B).

Example 4

Preparation of Phosphoric Ester Polymer II 100.00 parts of polyester (B) obtained by Example 3, 20 parts of propylene glycol monomethyl ether acetate was added in a glass reaction vessel. The temperature was heated to 80° C., then 30 parts of polyphosphoric acid was added at 80° C. The temperature was maintained at 80° C. for 3 hours. Then 397.8 parts of propylene glycol monomethyl ether acetate were added to the vessel. The temperature was heated to 115° C. The mixture containing 99.4 parts of styrene, 124.3 parts of SLMA[1], 49.7 parts of 2-hydroyl ethyl methacrylate, 59.7 parts of MPEG 350 MA[2] and 14.9 parts of Luperox-26[3] was added over a period of 2 hours. The reaction was maintained at 115° C. for another 2 hours. The phosphoric ester polymer solution had solid content of 50%, weight average molecular weight 9000 g/mole, Hydroxyl number of 50 mg KOH/g and acid number of 82 mg KOH/g.
1) Misubish gas, SLMA, C12~C13 mixture of alkyl methacrylate
2) Evonik, F M 515, MPEG 350 MA
3) Alkama, Luperox-26

Comparison Example 1

Preparation of Phosphoric Ester Polymer III

A phosphoric ester polymer I was prepared in a similar manner to Example 2 but the MPEG 500 MA was omitted from the reaction mixture.

Example 5

Application of an Inventive Composition

An Aluminum pigment solution I was prepared using the amount of ingredients listed below.

| Aluminum pigment [1] | 37.0 |
|---|---|
| Butyl glycol | 55.5 |
| Phosphoric ester polymer | 7.5 |

The ingredients were mixed 10 minutes and maintained at room temperature for 2 hours before further application.

A Waterborne paint I was prepared using the ingredients listed below.

| WL-91[2] | 33.26% |
|---|---|
| DI water | 33.26% |
| Butyl glycol | 1.11% |
| Butyl diethylene glycol | 1.11% |
| BYK-024[3] | 0.77% |
| WT-105A[4] | 0.22% |
| WT-115[5] (50% in water) | 2.16% |
| DMAE (10% in water) | 2.92% |
| DI water | 25.17% |
| Total | 100.00% |

1) Conventional sparkle paste (Silver-Dollar)
2) Rohm and Hass, acrylic emulsion WL-91
3) BYK-Chemie, Defoamer, BYK-024
4) Elementis Specialties, PU thickener, WT-105A
5) Elementis Specialties, ASE thickener, WT-115

A waterborne metallic paint was prepared as follows: 18.8 parts of aluminum pigment solution I were added to waterborne paint I under intensive mixing for 15 minutes. The resulting paint was sprayed over ABS plastic substrate and then baked at 80° C. for 30 minutes.

The flop index was measured using techniques known to those persons skilled in the art. The phosphoric ester polymers prepared in Examples 2 and 4 shows improved flop index values compared to the comparison example compositions.

|  | Example 2 | Example 4 | Comparison Example 1 |
|---|---|---|---|
| Flop index | 23.4 | 23.8 | 20.9 |

What is claimed is:

1. A phosphate group-containing resin comprising, as polymerized units:
   (a) a polymerizable unsaturated polyester having at least one phosphate group represented by formula [—OPO(OR$^1$)(OH)] (wherein R$^1$ represents a hydrocarbon group having 1 to 10 carbon atoms) and/or having at least one phosphoric acid group represented by a formula [—OPO(OH)$_2$]
   (b) a (meth)acrylate based polymerizable monomer, and
   (c) an alkoxylated (meth)acrylic acid polymerizable monomer, said alkoxylated moiety of alkoxylated (meth)acrylic acid polymerizable monomer comprising at least one segment of

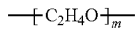

and at least one segment of

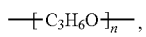

wherein m is an integer of 5 to 50, and n is an integer of 5 to 50.

2. The phosphate group-containing resin according to claim 1, wherein R$^1$ is a hydrocarbon group having 1 to 4 carbon atoms.

3. The phosphate group-containing resin according to claim 1, wherein R$^1$ is an alkyl group having 1 to 4 carbon atoms.

4. The phosphate group-containing resin according to claim 1, wherein the (meth)acrylate based polymerizable monomer (b) is selected from the group consisting of acrylic acid, methacrylic acid, alkyl(meth)acrylate, 2-hydroxyl ethyl (meth)acrylate and mixtures thereof, wherein the alkyl is a linear or branched alkyl having 8-18 carbon atoms.

5. The phosphate group-containing resin according to claim 4, wherein the alkyl has 12-13 carbon atoms.

6. The phosphate group-containing resin according to claim 1, wherein the polymerizable unsaturated polyester (a) has a weight average molecular weight of 300-10000 g/mole, a hydroxyl number of 50-400 mg KOH/g, and an acid number of 100-350 mg KOH/g.

7. The phosphate group-containing resin according to claim 1, wherein the phosphate group-containing resin has a weight average molecular weight of 1000-100,000 g/mole, an acid number of 0-250 mg KOH/g, and hydroxyl number of 0-250 mg KOH/g.

8. The phosphate group-containing resin according to claim 1, obtained by copolymerizing 1 to 30% by weight of the polymerizable unsaturated polyester (a), 10 to 50% by weight of the (meth)acrylate based polymerizable monomer (b) and 2 to 30% by weight of the alkoxylated (meth)acrylic acid polymerizable monomer (c), based on the total amount of the components (a) to (c).

9. The phosphate group-containing resin according to claim 2, wherein the (meth)acrylate based polymerizable monomer (b) is selected from the group consisting of acrylic acid, methacrylic acid, alkyl(meth)acrylate, 2-hydroxyl ethyl (meth)acrylate and mixtures thereof, wherein the alkyl is a linear or branched alkyl having 8-18 carbon atoms.

10. The phosphate group-containing resin according to claim 3, wherein the (meth)acrylate based polymerizable monomer (b) is selected from the group consisting of acrylic acid, methacrylic acid, alkyl(meth)acrylate, 2-hydroxyl ethyl (meth)acrylate and mixtures thereof, wherein the alkyl is a linear or branched alkyl having 8-18 carbon atoms.

11. The phosphate group-containing resin according to claim 10, wherein the alkyl has 12-13 carbon atoms.

12. A phosphate group-containing resin comprising, as polymerized units:
   a. a polymerizable unsaturated polyester having at least one phosphate group represented by formula [—OPO(OR$^1$)(OH)] (wherein R$^1$ represents a hydrocarbon group having 1 to 10 carbon atoms) and/or having at least one phosphoric acid group represented by a formula [—OPO(OH)$_2$]
   b. a (meth)acrylate based polymerizable monomer, and
   c. an alkoxylated (meth)acrylic acid polymerizable monomer, said alkoxylated (meth)acrylic acid polymerizable monomer (c) is ethoxylated (meth)acrylic acid polymerizable monomer having one segment of

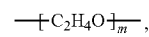

wherein m is an integer of 5 to 30.

13. The phosphate group-containing resin according to claim 12, wherein R$^1$ is a hydrocarbon group having 1 to 4 carbon atoms.

14. The phosphate group-containing resin according to claim 12, wherein R$^1$ is an alkyl group having 1 to 4 carbon atoms.

15. The phosphate group-containing resin according to claim 12, wherein the (meth)acrylate based polymerizable monomer (b) is selected from the group consisting of acrylic acid, methacrylic acid, alkyl(meth)acrylate, 2-hydroxyl ethyl (meth)acrylate and mixtures thereof, wherein the alkyl is a linear or branched alkyl having 8-18 carbon atoms.

16. The phosphate group-containing resin according to claim 15, wherein the alkyl has 12-13 carbon atoms.

17. The phosphate group-containing resin according to claim 12, wherein the ethoxylated (meth)acrylic acid polymerizable monomer has a weight average molecular weight of 300-1500 g/mole.

18. The phosphate group-containing resin according to claim 12, wherein the polymerizable unsaturated polyester (a) has a weight average molecular weight of 300-10000 g/mole, a hydroxyl number of 50-400 mg KOH/g, and an acid number of 100-350 mg KOH/g.

19. The phosphate group-containing resin according to claim 12, wherein the phosphate group-containing resin has a weight average molecular weight of 1000-100,000 g/mole, an acid number of 0-250 mg KOH/g, and hydroxyl number of 0-250 mg KOH/g.

* * * * *